United States Patent
Ho et al.

(10) Patent No.: US 12,539,986 B2
(45) Date of Patent: Feb. 3, 2026

(54) CARGO CONTAINER DEVICE INCLUDING POWER SUPPLY AND TRANSPORT SYSTEM INCLUDING PACKSTATION FOR UAV

(71) Applicant: Industrial Technology Research Institute, Hsinchu (TW)

(72) Inventors: Ming-Hsuan Ho, Hsinchu County (TW); Hon-Yue Chou, Taipei (TW); Yi-Yuan Chen, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 446 days.

(21) Appl. No.: 17/562,992

(22) Filed: Dec. 27, 2021

(65) Prior Publication Data

US 2023/0202679 A1 Jun. 29, 2023

(51) Int. Cl.
| | |
|---|---|
| *B64U 50/35* | (2023.01) |
| *B64F 1/00* | (2024.01) |
| *B64F 1/04* | (2024.01) |
| *B64U 10/13* | (2023.01) |
| *B64U 50/19* | (2023.01) |
| *B64U 50/34* | (2023.01) |
| *B64U 80/70* | (2023.01) |

(52) U.S. Cl.
CPC ............... *B64U 50/35* (2023.01); *B64F 1/00* (2013.01); *B64F 1/005* (2013.01); *B64U 10/13* (2023.01); *B64U 50/19* (2023.01); *B64U 50/34* (2023.01); *B64U 80/70* (2023.01)

(58) Field of Classification Search
CPC .......... B64F 1/005; B64F 1/04; B64C 39/024; B64U 50/34; B64U 80/70
See application file for complete search history.

(56) References Cited

U.S. PATENT DOCUMENTS

| | | | |
|---|---|---|---|
| 9,139,310 B1 | 9/2015 | Wang | |
| 11,597,291 B1* | 3/2023 | Bikumala | ........... G06F 13/4282 |
| 2016/0236582 A1 | 8/2016 | Wang | |
| 2017/0283090 A1* | 10/2017 | Miller | .................... B64U 50/39 |

(Continued)

FOREIGN PATENT DOCUMENTS

| | | | | |
|---|---|---|---|---|
| CN | 104743121 A | * | 7/2015 | ............... B64D 9/00 |
| CN | 105691617 | | 10/2017 | |

(Continued)

OTHER PUBLICATIONS

CN-104743121-A Translation (Year: 2015).*

(Continued)

*Primary Examiner* — Brady W Frazier
*Assistant Examiner* — Steven J Shur

(57) ABSTRACT

A container device of a UAV is provided. The container device is configured to receive a cargo and be connected to a UAV. The container device includes an outer housing, an inner housing, and a power supply. The outer housing is connected to the UAV. The inner housing is detachably connected to the outer housing, and configured to receive the cargo. The power supply is disposed in the inner housing. When the outer housing is connected to the UAV and the inner housing is connected to the outer housing, the power supply is electrically connected to a battery of the UAV. A transport system of a UAV is also provided.

15 Claims, 16 Drawing Sheets

(56) References Cited

U.S. PATENT DOCUMENTS

| | | | |
|---|---|---|---|
| 2019/0118974 A1 | 4/2019 | Martin | |
| 2019/0359400 A1* | 11/2019 | Pariente-Cohen | B65D 5/4212 |
| 2019/0389577 A1 | 12/2019 | Jones et al. | |
| 2021/0148131 A1 | 5/2021 | Wankewyez | |
| 2021/0309388 A1* | 10/2021 | Ratajczak | G08G 5/0069 |
| 2021/0347500 A1* | 11/2021 | Hagan | B64C 39/024 |
| 2022/0161928 A1* | 5/2022 | Scott | B64U 50/38 |
| 2023/0373664 A1* | 11/2023 | Potentas | B64U 50/39 |

FOREIGN PATENT DOCUMENTS

| | | | |
|---|---|---|---|
| CN | 108128476 A | 6/2018 | |
| CN | 105529788 | 10/2018 | |
| CN | 106573684 B | 5/2019 | |
| CN | 208931891 U | 6/2019 | |
| CN | 209225411 U | 8/2019 | |
| CN | 107161343 | 5/2020 | |
| CN | 213262923 U | 5/2021 | |
| KR | 20200118518 A * | 10/2020 | B60L 53/38 |
| TW | I593451 | 8/2017 | |
| TW | M579138 U | 6/2019 | |
| TW | I678320 B | 12/2019 | |
| TW | I694660 | 5/2020 | |
| TW | I696571 B | 6/2020 | |
| TW | I711560 B | 12/2020 | |
| TW | M604938 U | 12/2020 | |
| TW | M608146 U | 2/2021 | |

OTHER PUBLICATIONS

KR-20200118518-A Translation (Year: 2020).*
Ebrahimi, Nafiseh. "Solenoid Actuator." Solenoid Actuator—an Overview | ScienceDirect Topics, Soft Robotics in Rehabilitation, 2021, www.sciencedirect.com/topics/engineering/solenoid-actuator. (Year: 2021).*
Shao, Pei-Chi, et al., "Survey On UAV Application Practice and National Policy in Transportation Field", Transportation Planning Journal, Sep. 2020, pp. 201-234, Vol. 49, Taiwan.
Taiwan Patent Office, Office Action, Patent Application Serial No. 111109534, Nov. 2, 2022, Taiwan.

* cited by examiner

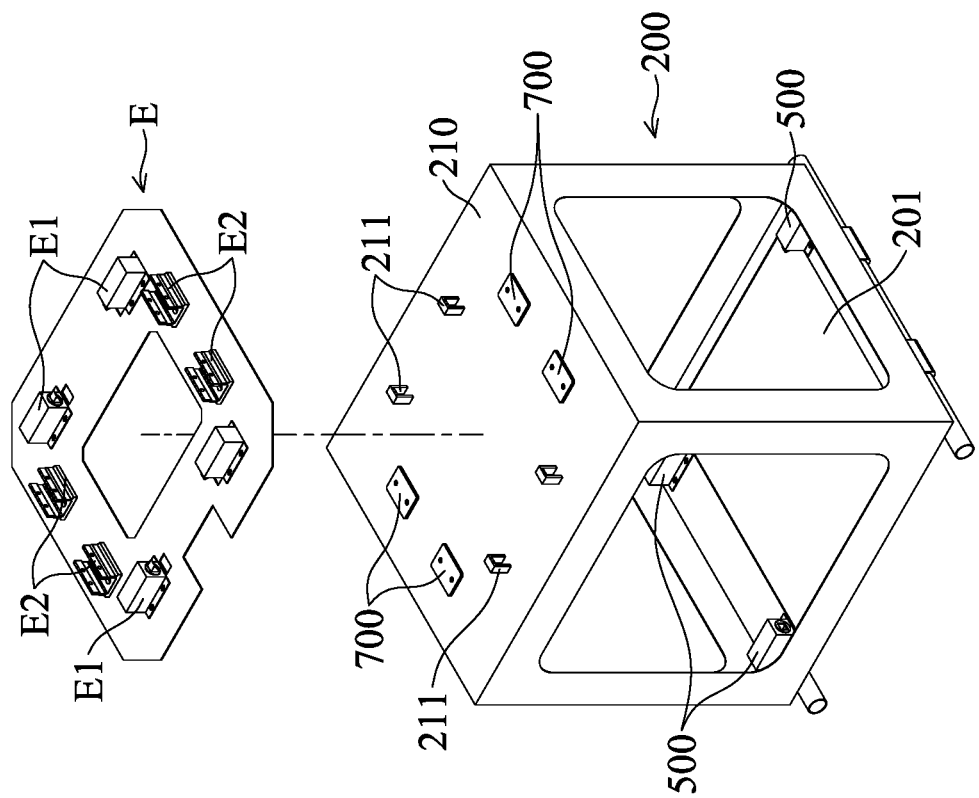

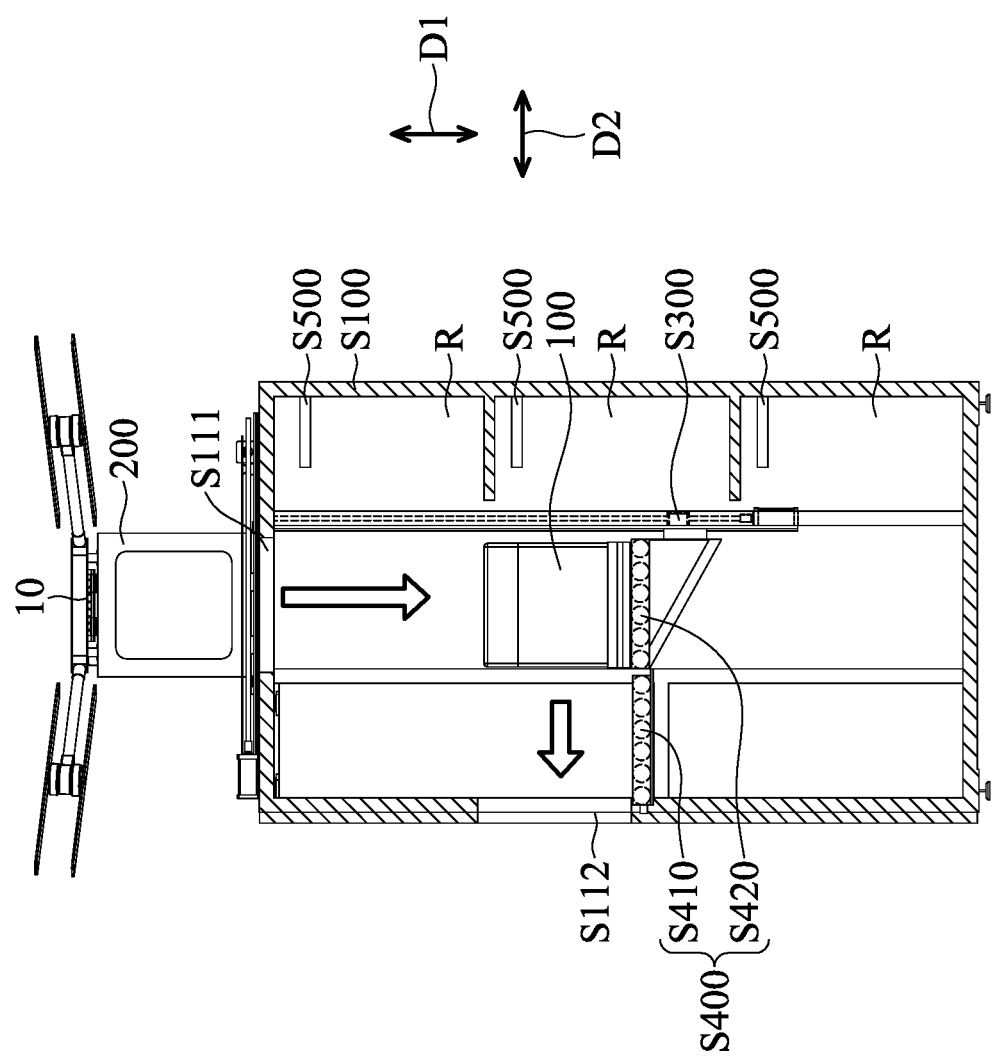

CARGO CONTAINER DEVICE INCLUDING POWER SUPPLY AND TRANSPORT SYSTEM INCLUDING PACKSTATION FOR UAV

BACKGROUND

Technical Field

The disclosure relates in general to a container device, and relates to a container device and a transport system of a UAV.

Description of the Related Art

Recent technological progress has seen unmanned aerial vehicles (UAVs, also known as drones) being used in the transportation industry. At present, if a commercial drone product is required to fly a distance of 10-50 kilometers and carry a load greater than 10 kilograms, it needs to change its battery or temporarily stop to recharge it after 25 kilometers. Thus, it is important to solve the problem of how far a drone can travel in the commercial logistics industry. The average flight of current commercial UAVs is substantially less than 25 kilometers, and their flight time is a mere 15-30 minutes, restricting how widely such drones can be applied. The charging time of a consumer-grade or commercial UAV is longer than one hour. If the UAV has a long flight time, the user needs to manually replace the battery. A fast-charging apparatus would cost too much. Moreover, as the charge-discharge cycle of fast charging batteries becomes shorter, their storage capacity declines.

Because of these restrictions on battery capacity, if a long distance and/or high load transport is required, the UAV will need to stop to either charge or replace its battery at the halfway point of its transportation task.

SUMMARY

A container device of a UAV is provided. The container device is configured to receive a cargo and be connected to a UAV. The container device includes an outer housing, an inner housing, and a power supply. The outer housing is connected to the UAV. The inner housing is detachably connected to the outer housing, and configured to receive the cargo. The power supply is disposed in the inner housing. When the outer housing is connected to the UAV and the inner housing is connected to the outer housing, the power supply is electrically connected to a battery of the UAV.

A transport system of a UAV is also provided, including the aforementioned container device and a packstation. The packstation includes a main body, a lifter, and a conveyor. The main body has a delivery opening and a pick-up opening. The lifter is disposed in the main body, and is connected to the delivery opening. The conveyor is disposed in the main body, and is connected to the lifter and the pick-up opening. The lifter is configured to move the inner housing in a first direction, and the conveyor is configured to move the inner housing in a second direction. The first direction is different from the second direction.

BRIEF DESCRIPTION OF DRAWINGS

The disclosure can be more fully understood by reading the subsequent detailed description and examples with references made to the accompanying drawings, wherein:

FIG. 3A is a schematic diagram of an outer housing and an intermediate component according to an embodiment of the disclosure;

FIG. 6E is a schematic diagram representing that a lifter and a conveyor move the inner housing from a delivery opening to a pick-up opening according to an embodiment of the disclosure.

DESCRIPTION OF THE EMBODIMENTS

The making and using of the embodiments of the container device and the transport system of unmanned aerial vehicle (UAV) are discussed in detail below. However, that the embodiments provide many applicable inventive concepts that can be embodied in a wide variety of specific contexts. The embodiments discussed are merely illustrative of the ways to make and use the embodiments, and do not limit the scope of the disclosure.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

The following disclosure provides many different embodiments, or examples, for implementing different features of the subject matter provided. Specific examples of solutions and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
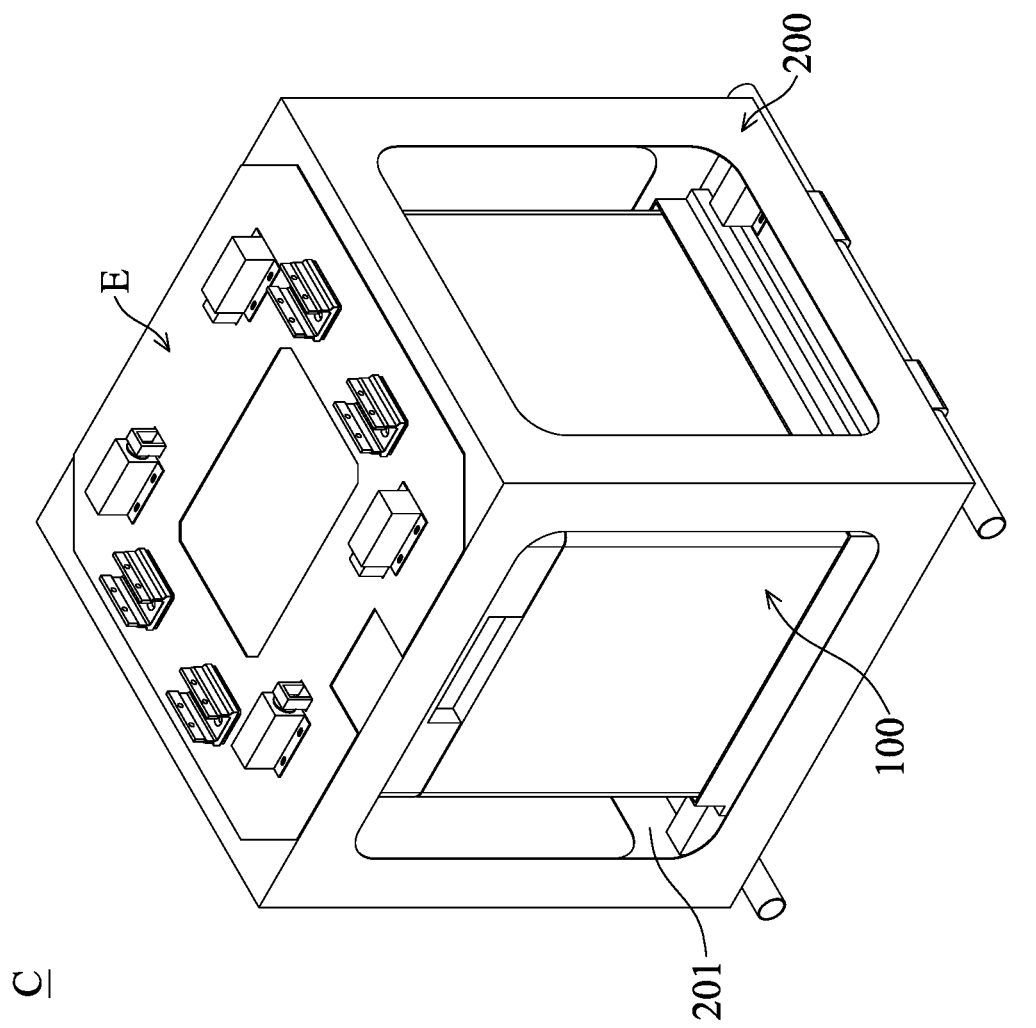
FIG. 1 is a schematic diagram of a container device of a UAV according to an embodiment of the disclosure.

Referring to FIG. 1, in an embodiment of disclosure, a container device C of UAV includes an inner housing 100, an outer housing 200, and an intermediate component E. The inner housing 100 and the outer housing 200 are detachably engaged to each other, and the intermediate component E is affixed to the outer housing 200. When the inner housing 100 is engaged to the outer housing 200, the inner housing 100 is accommodated in a receiving space 201 of the outer housing 200, and the outer housing 200 surrounds the inner housing 100, so as to prevent the inner housing 100 from coming into collision with the external component(s). The outer housing 200 can be connected to a UAV (such as the UAV 10 shown in FIG. 5) via the intermediate component E. Therefore, when the inner housing 100 is connected to the outer housing 200, and the outer housing 200 is connected to the UAV, the UAV can bring the whole container device C to move.

Figure 2A:
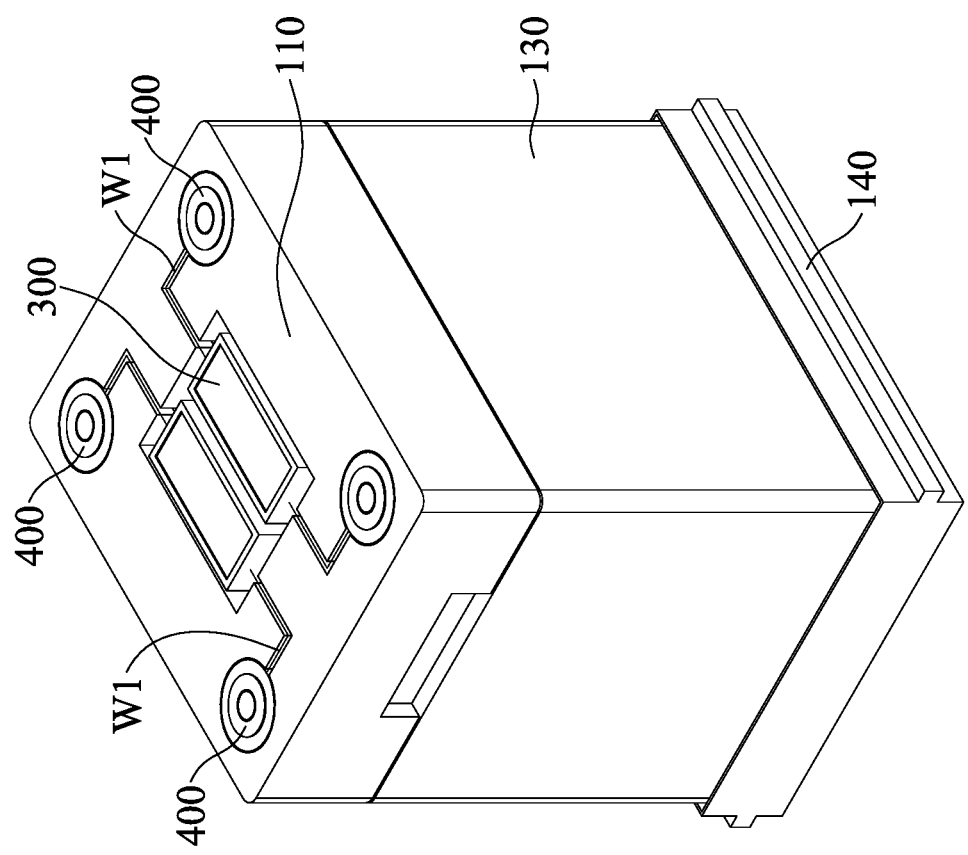
FIG. 2A is a schematic diagram of an inner housing according to an embodiment of the disclosure.
Figure 2B:
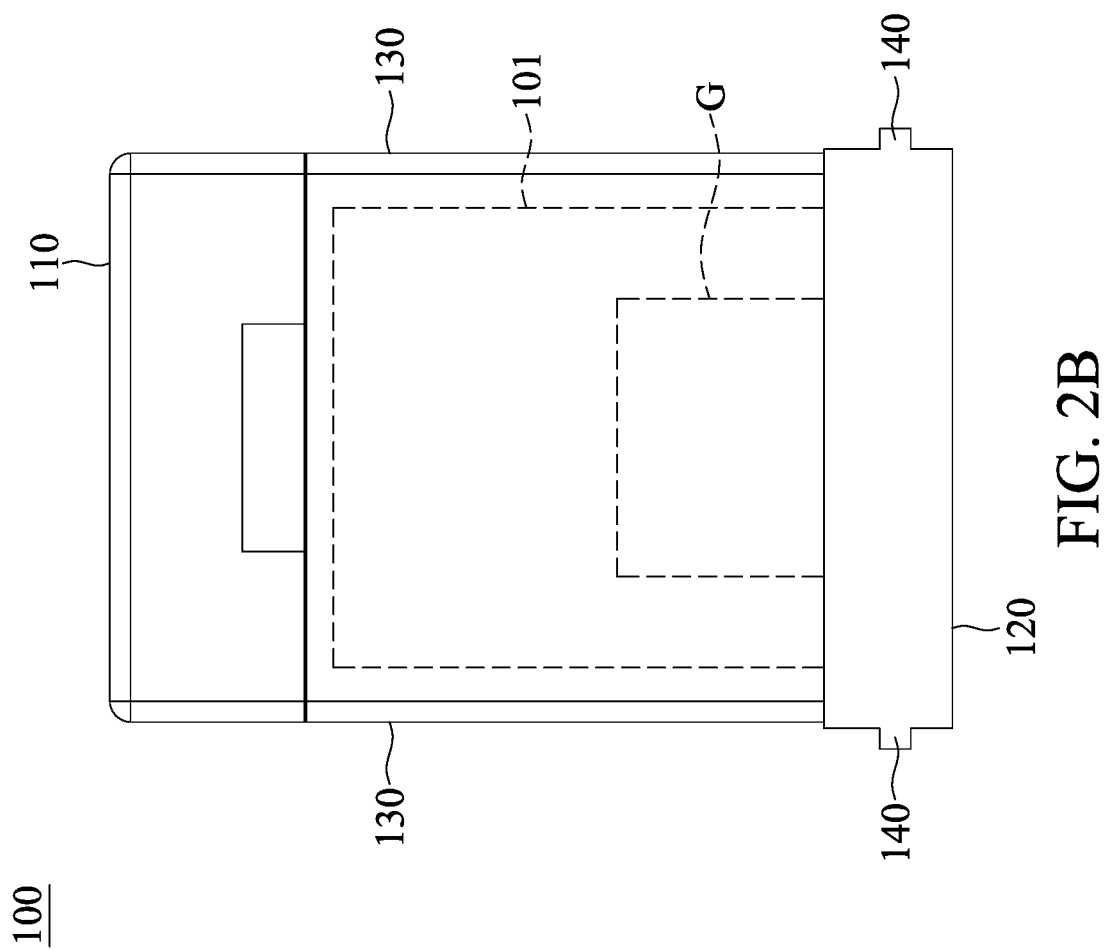
FIG. 2B is a front view of the inner housing according to an embodiment of the disclosure.

FIG. 2A is a schematic diagram of the inner housing 100, and FIG. 2B is a front view thereof. As shown in FIG. 2A and FIG. 2B, an accommodating space 101 for receiving a cargo to be loaded (such as a cargo G) can be formed in the inner housing 100 of the container device C. Moreover, a power supply 300 and at least one charging module 400 (first charging module) can be disposed on the inner housing 100. The charging module 400 can be electrically connected to the power supply 300 via wires W1 embedded in the inner housing 100.

In this embodiment, the power supply 300 and the charging modules 400 are disposed on a top surface 110 of the inner housing 100, and the charging modules 400 are adjacent to the different corners of the top surface 110. Thus, the interference that may take place between charging modules 400 while in operation can be prevented, and the length of each of the wires W1 can be reduced to simplify the process and prevent the wires W1 from breaking. In some embodiments, the power supply 300 can be disposed in a position that is adjacent to the bottom surface 120 of the inner housing 100, so as to lower the position of the center of gravity of the container device C.

Furthermore, the inner housing 100 includes a lateral surface 130 and at least one protruding portion 140. The lateral surface 130 connects the top surface 110 to the bottom surface 120, and the protruding portion 140 protrudes from the lateral surface 130. In this embodiment, the protruding portion 140 is adjacent to the bottom surface 120. In other words, the distance between the protruding portion 140 and the bottom surface 120 is less than the distance between the protruding portion 140 and the top surface 110.

Figure 3B:
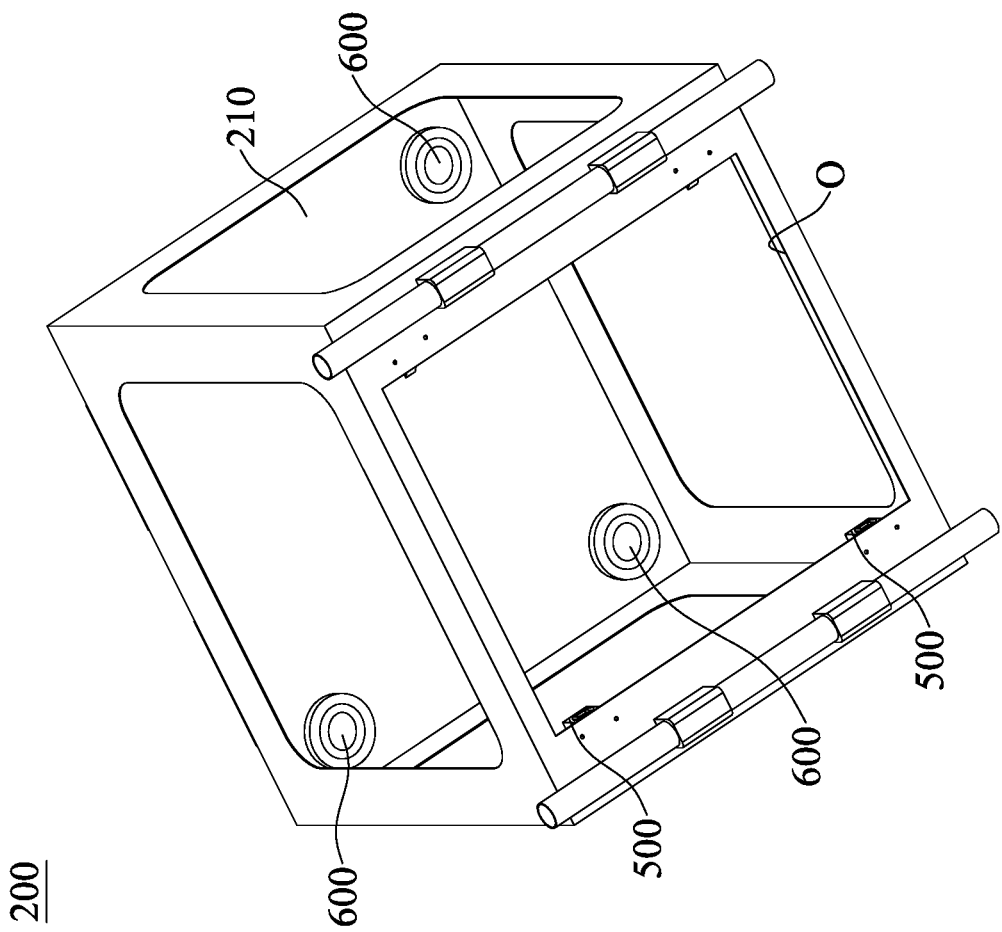
FIG. 3B is a schematic diagram of the outer housing according to an embodiment of the disclosure.
Figure 3C:
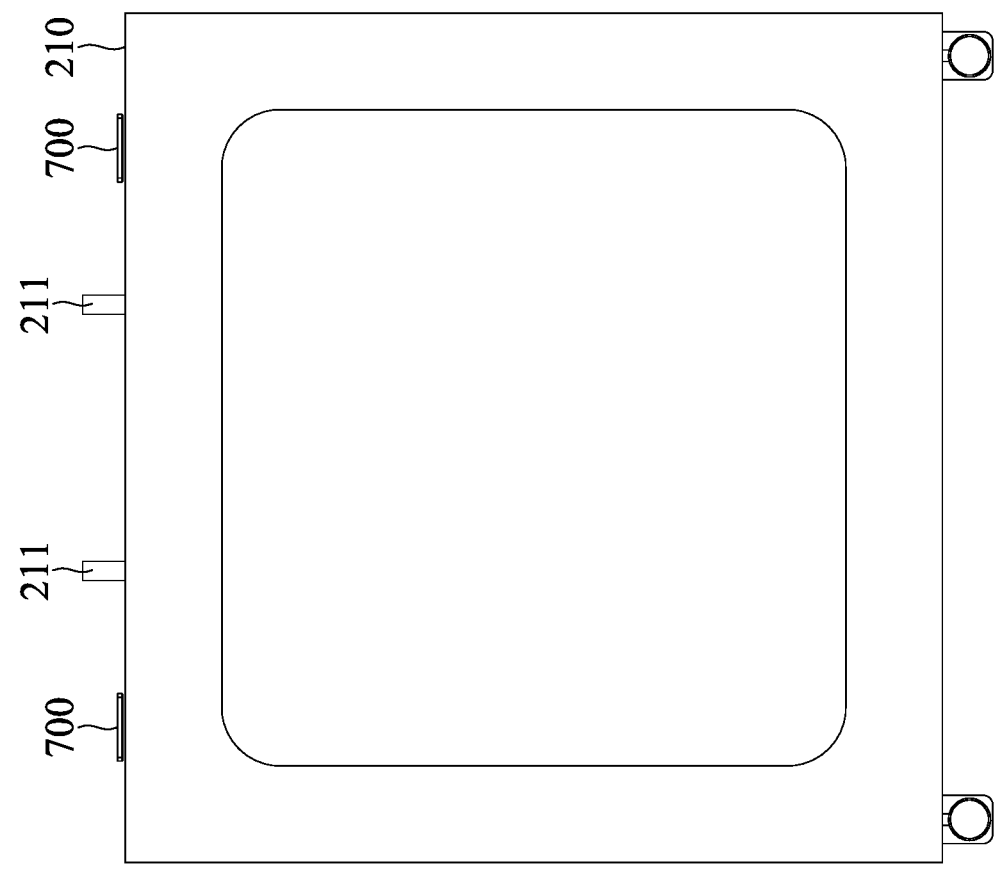
FIG. 3C is a front view of the outer housing according to an embodiment of the disclosure.

FIG. 3A is a schematic diagram of the outer housing 200 and the intermediate component E, FIG. 3B is a schematic diagram of the outer housing 200 in another view, and FIG. 3C is a front view of the outer housing 200. As shown in FIG. 3A to FIG. 3C, one or more solenoid valves 500 are disposed in the receiving space 201 of the outer housing 200, and configured to affix the inner housing 100 in the receiving space 201 of the outer housing 200.

Figure 4A:
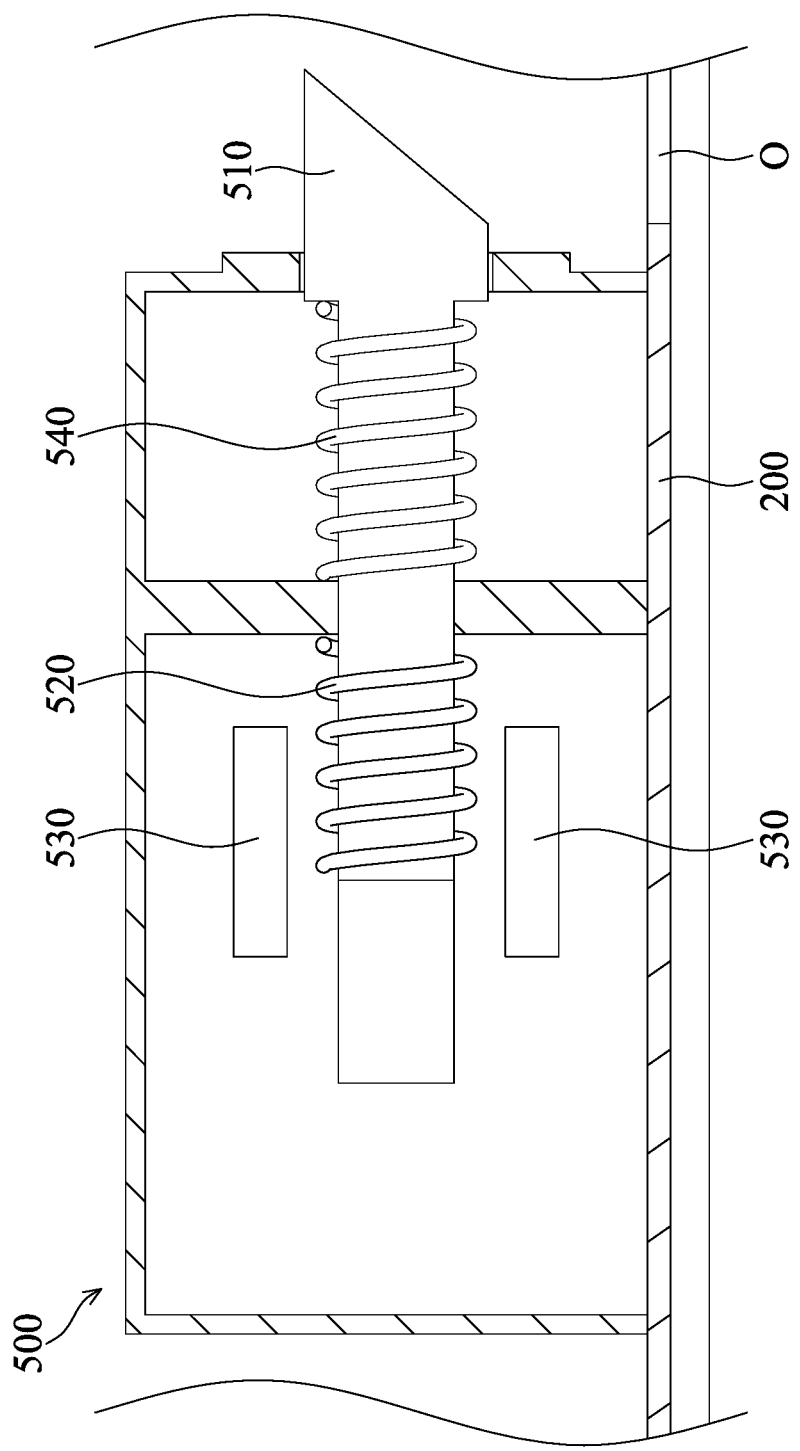
FIG. 4A is a schematic diagram of a solenoid valve according to an embodiment of the disclosure.

As shown in FIG. 4A, the solenoid valve 500 includes a locking member 510, a coil 520, at least one magnetic member 530, and an elastic member 540. The locking member 510 is movable relative to the outer housing 200, and the coil 520 winds around the locking member 510. The magnetic member 530 is affixed relative to the outer housing 200, and the elastic member 540 is connected to the locking member 510 and the outer housing 200.

Figure 4B:
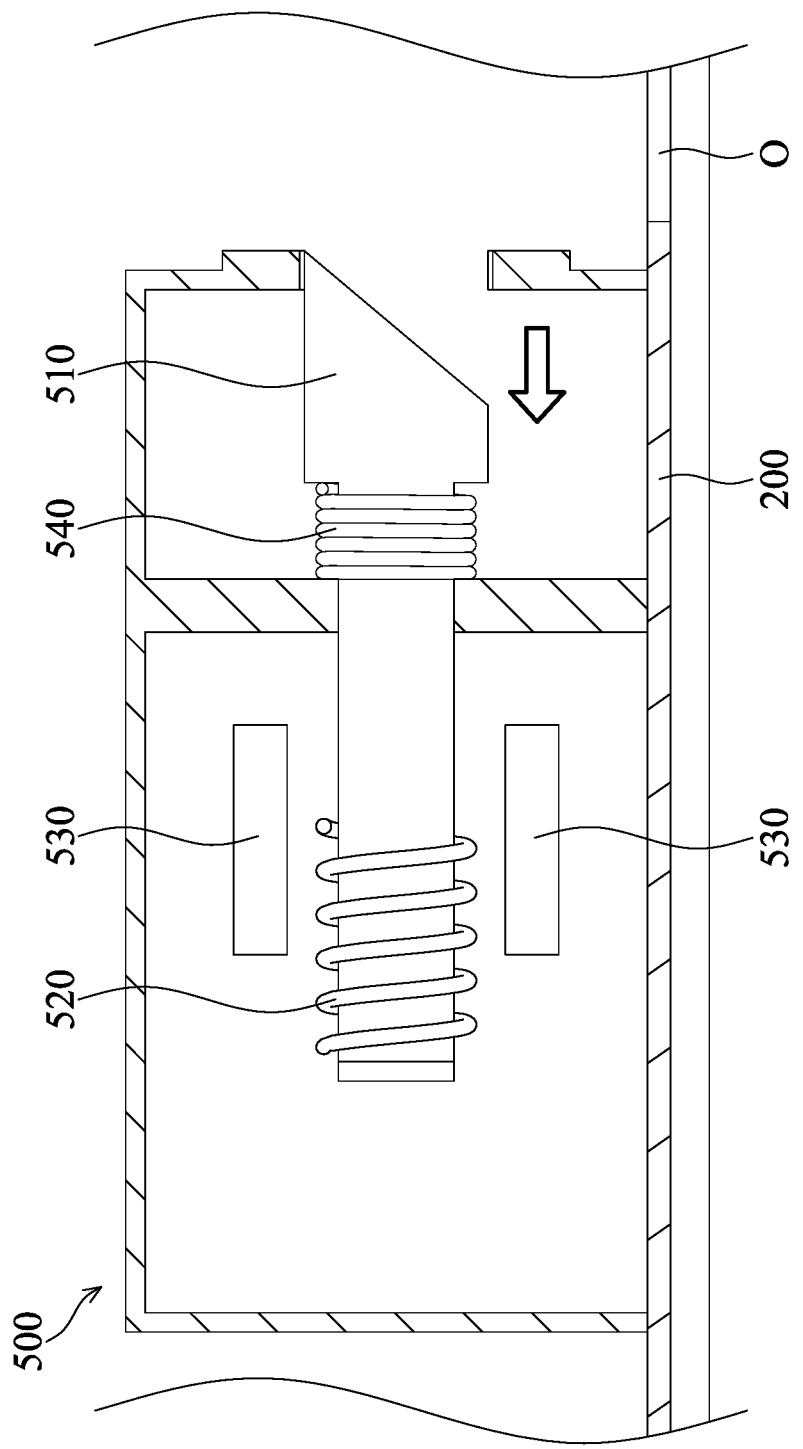
FIG. 4B is a schematic diagram representing that a locking member of the solenoid valve is driven to move according to an embodiment of the disclosure.
Figure 4C:
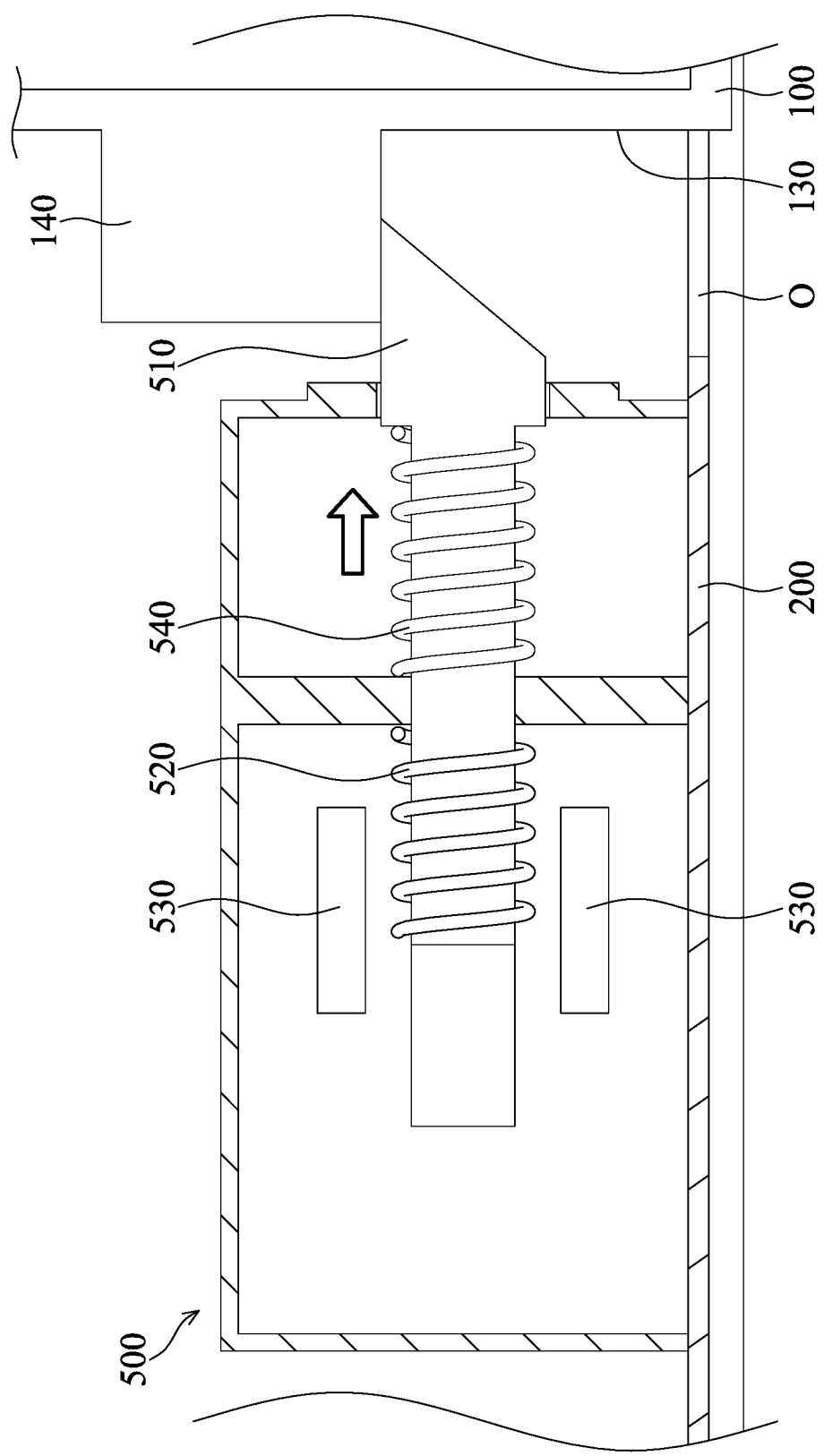
FIG. 4C is a schematic diagram representing that the inner housing is affixed to the outer housing by the solenoid valve according to an embodiment of the disclosure.

When there is no current flowing through the coil 520, the locking member 510 is held in a first position by the elastic force of the elastic member 540 (FIG. 4A). When the user wants to connect the inner housing 100 to the outer housing 200, a current can flow through the coil 520. An electromagnetic effect is generated between the coil 520 and the magnetic member 530, and the locking member 510 is driven to move from the first position to a second position (FIG. 4B). Therefore, the inner housing 100 can enter the receiving space 201 via an opening O at the lower part of the outer housing 200. After the inner housing 100 enters the receiving space 201, the current can be stop flowing through the coil 520, the locking member 510 can be pushed by the elastic force of the elastic member 540 from the second position to the first position and in contact with the lower surface of the protruding portion 140 (FIG. 4C). The inner housing 100 can be steadily affixed to the outer housing 200 by the aforementioned steps.

When the user wants to take out the inner housing 100 in the receiving space 201, the current can flow through the coil 520 again, and the locking member 510 moves from the first position to the second position and separates from the inner housing 100. The inner housing 100 can leave the receiving space 201 from the opening O at the lower part of the housing 200. In this embodiment, the elastic member 540 is a compression spring.

Referring to FIG. 3A to FIG. 3C, at least one charging module 600 (second charging module) and at least one elastic contact 700 are disposed on a top wall 210 of the outer housing 200. The charging module 600 is disposed on the surface of the top wall 210 facing the opening O, and the position of the charging module 600 corresponds to the charging module 400 on the inner housing 100. The elastic contact 700 is disposed on the surface of the top wall 210 facing away the opening O, and is electrically connected to the charging module 600.

In this embodiment, both the charging module 400 on the inner housing 100 and the charging module 600 on the outer housing 200 are wireless charging modules. Therefore, when the inner housing 100 is connected to the outer housing 200, the electromagnetic induction is generated between the charging module 400 and the charging module 600, so that the power supply 300 can provide power to the charging module 600 by a wireless manner. In some embodiments, the charging module 400 and the charging module 600 can be electric contacts. When the inner housing 100 is connected to the outer housing 200, the charging module 400 is in direct contact with the charging module 600.

Referring to FIG. 3A to FIG. 3C again, at least one latch portion 211 is formed on the top wall 210 of the outer housing 200 and protrudes from the top wall 210, and the intermediate component E has at least one solenoid valve E1 corresponding to the latch portion 211. The structure of the solenoid valve E1 is the same as that of the solenoid valve 500, so that the features thereof are not repeated in the interest of brevity. By the engagement between the latch portion 211 and the solenoid valve E1, the intermediate component E can be steadily affixed to the top wall 210 of the outer housing 200.

The intermediate component E further includes at least one engaging slot E2, and the shape of the engaging slot E2 corresponds to the shape of the foot of the UAV. For example, the engaging slot E2 can include T-shaped structure or L-shaped structure. Thus, when the foot of the UAV slides into the engaging slot E2, the engagement between the UAV and the outer housing 200 is completed.

Figure 5:
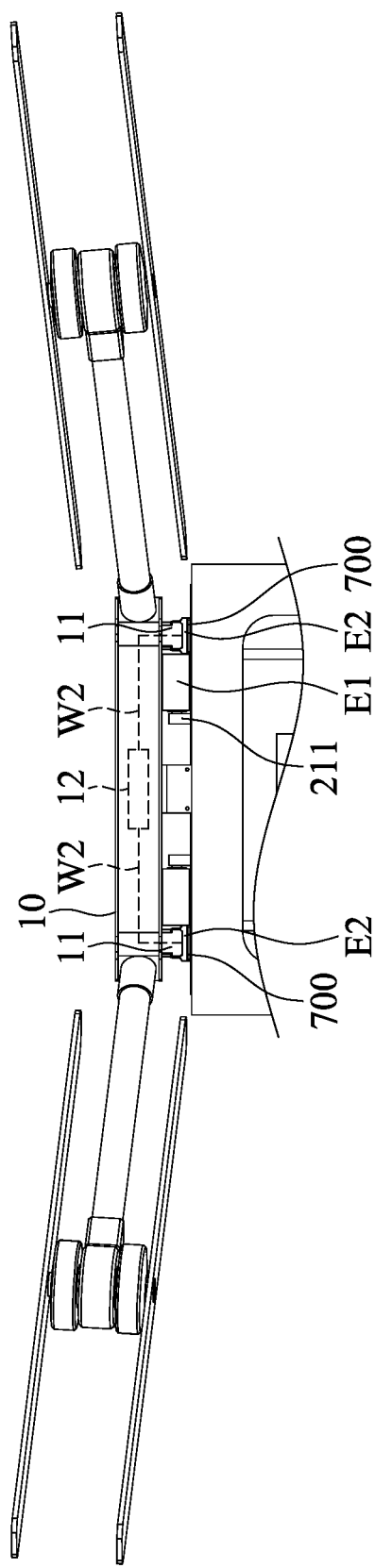
FIG. 5 is a schematic diagram representing that the outer housing is affixed to a UAV via the intermediate component, according to an embodiment of the disclosure.

FIG. 5 shows that a foot 11 of the UAV 10 enters the engaging slot E2 of the intermediate component E, so that the outer housing 200 can be affixed to the UAV 10. In this embodiment, when the intermediate component E is assembled on the top wall 210 of the outer housing 200, the engaging slot E2 is in direct contact with the electric contact 700, therefore, the engaging slot E2 is electrically connected to the electric contact 700. When the outer housing 200 is connected to the UAV 10, a battery 12 in the UAV 10 is electrically connected to the charging module 600 via the wire W2 in the foot 11, the engaging slot E2, and the electric contact 700. Thus, when the UAV 10 brings the container device C to move, the power supply 300 can provide power to the battery 12 through the charging module 400 and the charging module 600, and the operating time and the moving distance of the UAV 10 can be increased.

In some embodiments, the UAV 10 has a wireless charging module therein, and the charging module 600 on the outer housing 200 can be omitted. The charging module 400 on the inner housing 100 can directly provide power to the battery 12 in the UAV 10 by a wireless manner.

Figure 6A:
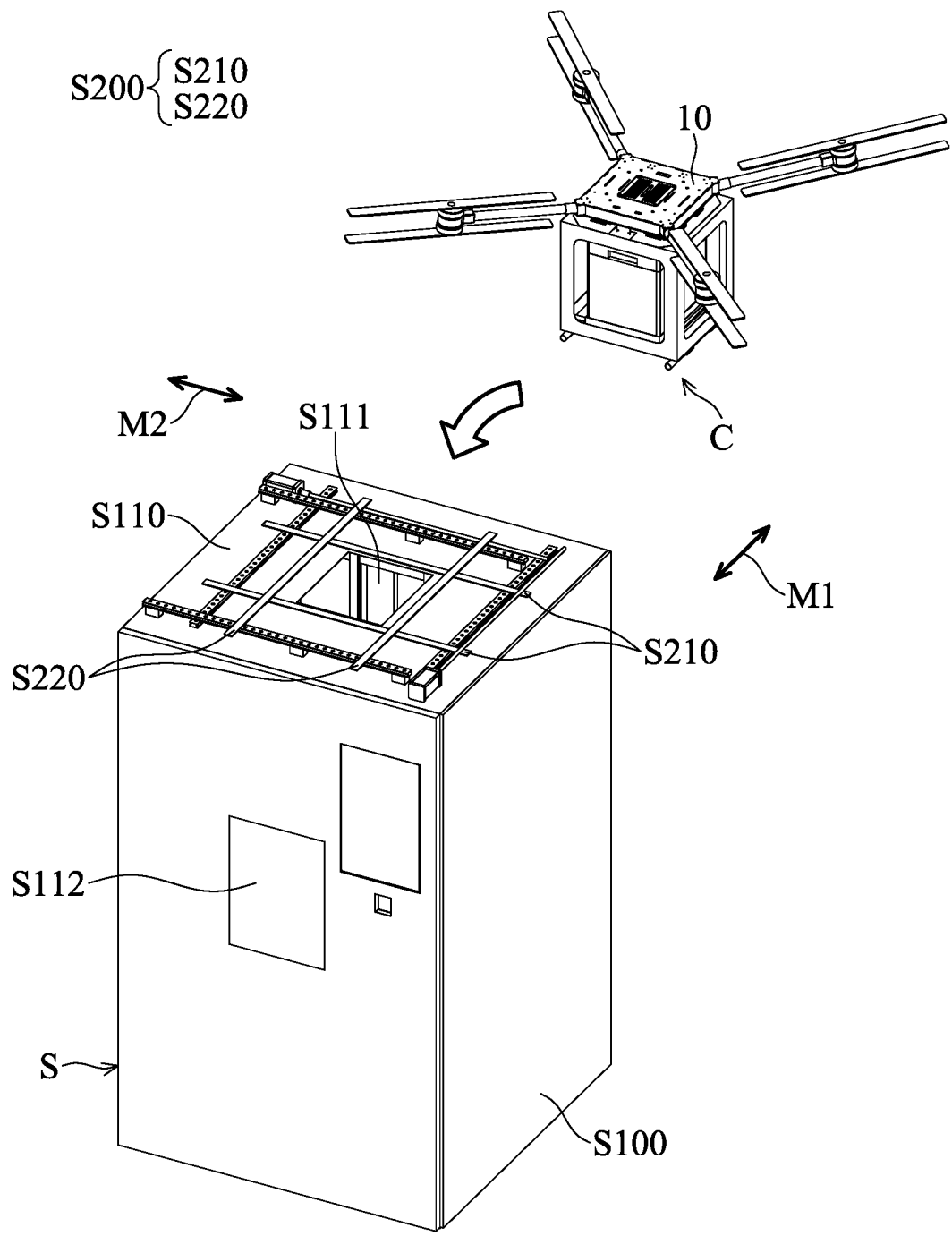
FIG. 6A is a schematic diagram representing that the UAV brings the container device to move to a packstation according to an embodiment of the disclosure.

The transport system including the aforementioned container device C and a packstation S and its usage method are discussed below. Referring to FIG. 6A, first, when the UAV 10 brings the container device C to move to the packstation S, the UAV 10 can dock on a top surface S110 of a main body S100 of the packstation S. A delivery opening S111 is formed on the top surface S110 of the packstation S, and a positioner S200 is disposed on the top surface S110.

Figure 6B:
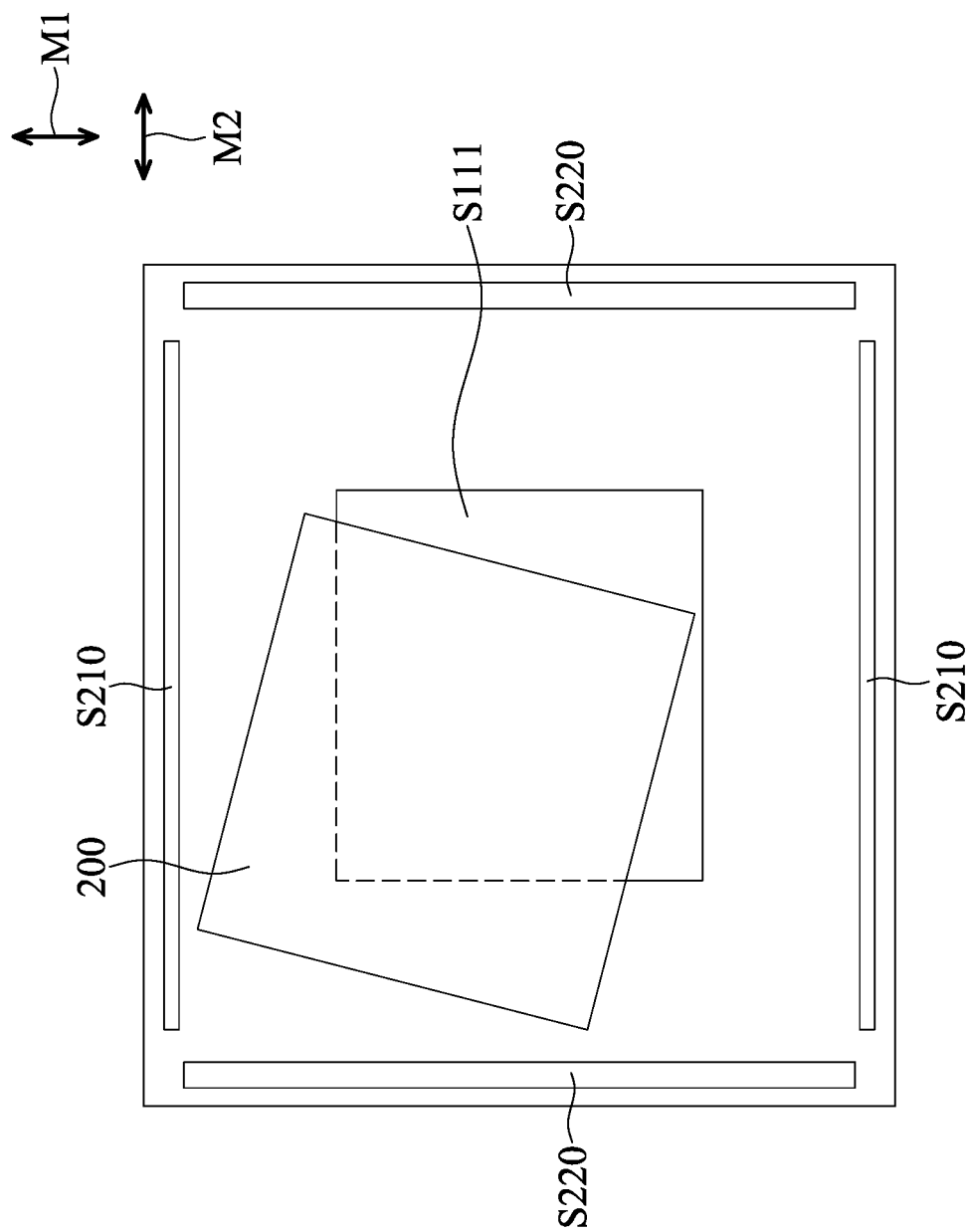
FIG. 6B to FIG. 6D are schematic diagrams representing that the container device is positioned by a positioner according to an embodiment of the disclosure.
Figure 6C:
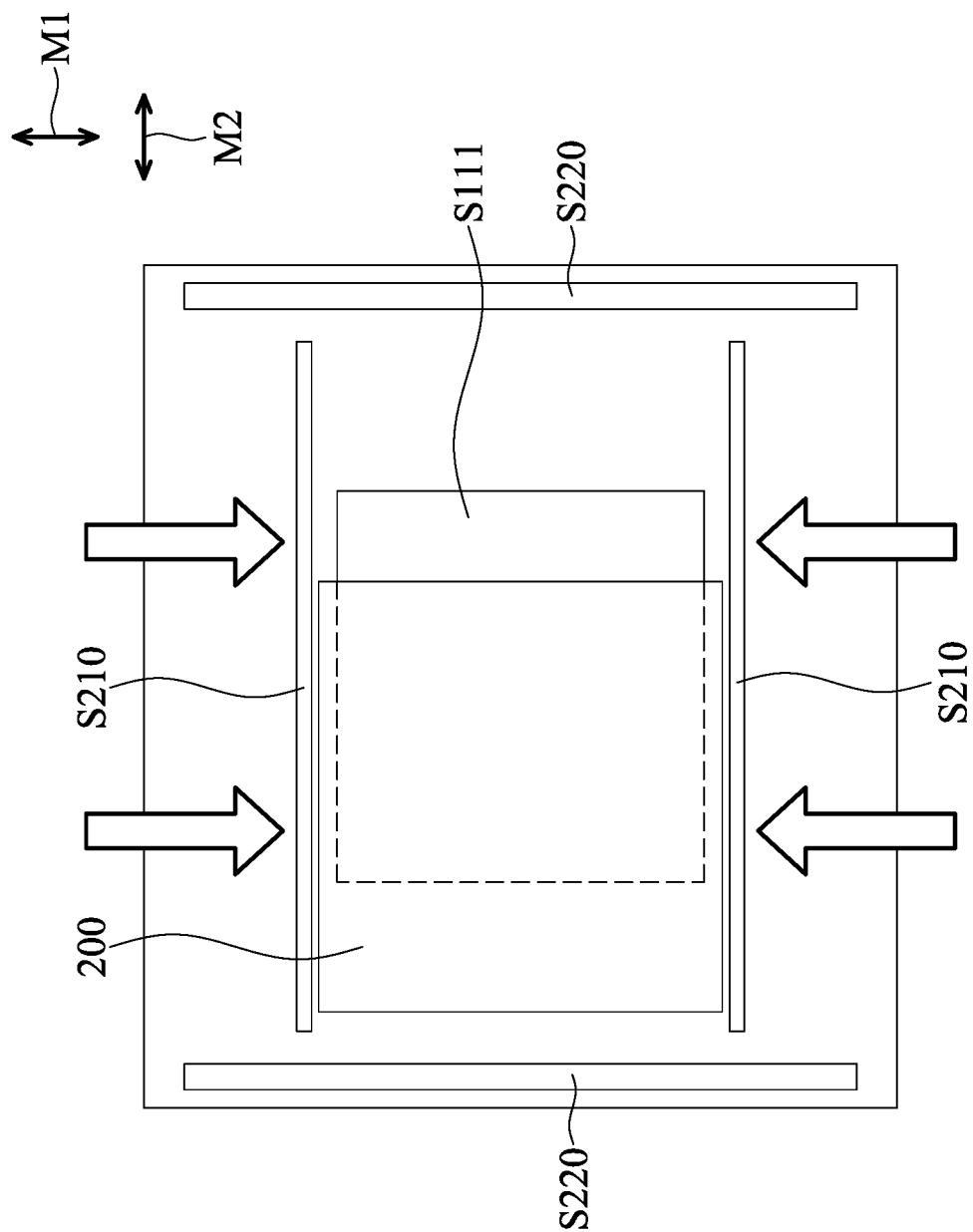
Figure 6D:
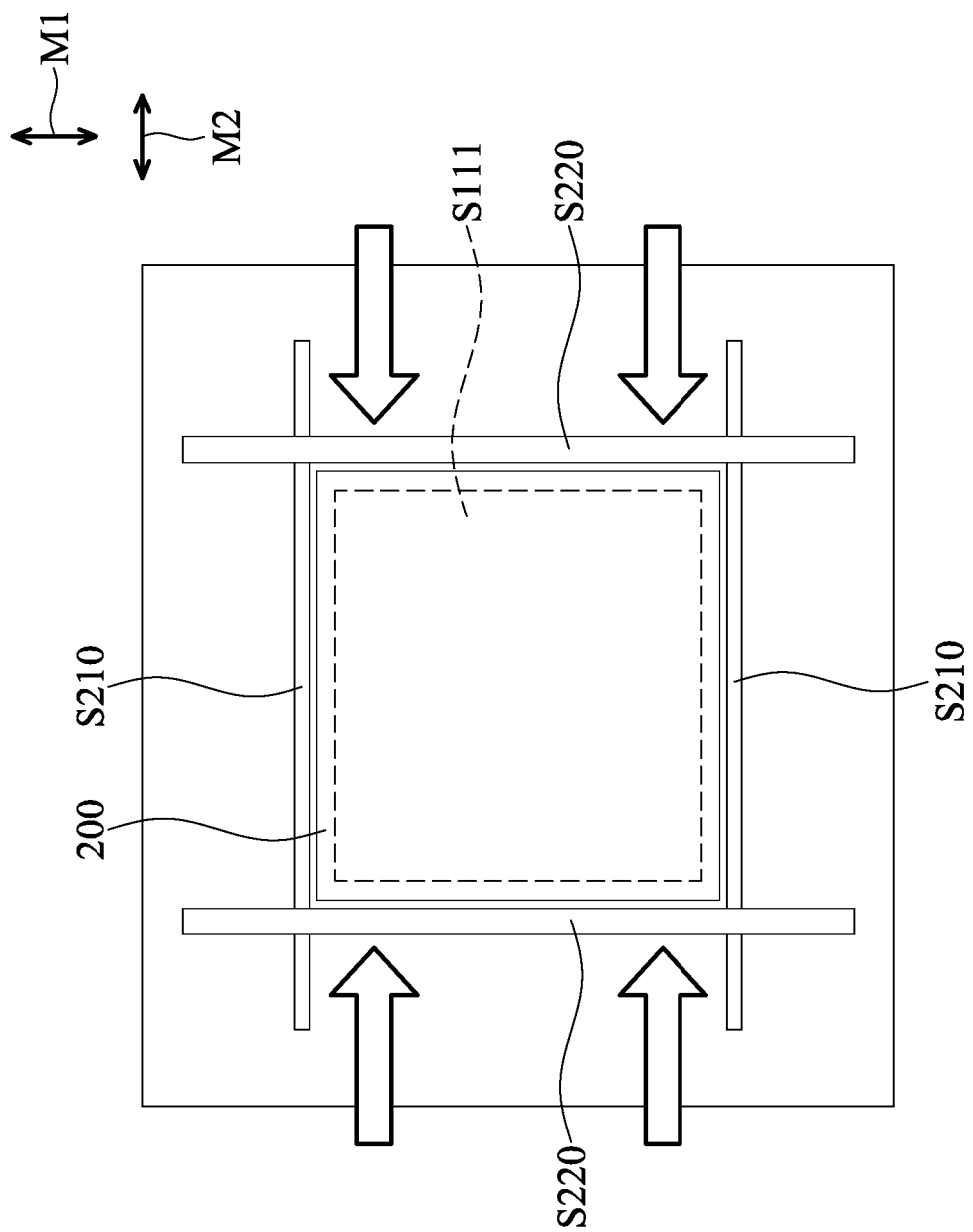

The positioner S200 can move the UAV 10 to a predetermined position, where the inner housing 100 in the container device C can enter into the main body S100 of the packstation S via the delivery opening S111. In detail, the positioner S200 can include at least one first longitudinal member S210 and at least one second longitudinal member S220, wherein the first longitudinal member S210 can reciprocate in the first moving direction M1, and the second longitudinal member S220 can reciprocate in the second moving direction M2. The longitudinal axis of the first longitudinal member S210 is parallel to the second moving direction M2, and the longitudinal axis of the second longitudinal member S220 is parallel to the first moving direction M1. Therefore, as shown in FIG. 6B to FIG. 6D, when the first longitudinal member S210 and the second longitudinal member S220 approach the container device C simultaneously or in sequence, the container device C can rotate to an orientation corresponding to the delivery opening S111. Moreover, by controlling the moving speed of the first longitudinal member S210 and the second longitudinal member S220, the container device C can move to the position corresponding to the delivery opening S111.

For example, the first longitudinal member S210 and the second longitudinal member S220 can be driven to move by screw rods, sliding rails, or pneumatic cylinders, but it is not limited thereto.

As shown in FIG. 6E, after the container device C is positioned by the positioner S200, the solenoid valve 500 of the container device C can be separated from the inner housing 100 of the container device C, and the inner housing 100 can enter into the main body S100 of the packstation S via the delivery opening S111. In this embodiment, a lifter S300 and a conveyor S400 are disposed in the main body S100. The lifter S300 is connected to the delivery opening S111 and the conveyor S400, and the conveyor S400 is connected to the lifter S300 and a pick-up opening S112.

The lifter S300 can move the inner housing 100 in a first direction D1, the conveyor S400 can move the inner housing 100 in a second direction D2, and the first direction D1 is different from the second direction D2. Therefore, the inner housing 100 entering into the main body S100 can be transported to the pick-up opening S112 by the lifter S300 and the conveyor S400. The user can pick up the inner housing 100 through the pick-up opening S112, and pick up the cargo from the accommodating space 101 of the inner housing 100. In this embodiment, the first direction D1 is perpendicular to the second direction D2.

In this embodiment, the conveyor S400 has a first section S410 and a second section S420. The first section S410 corresponds to the pick-up opening S112 and is affixed to the main body S100, and the second section S420 is connected to the lifter S300. The lifter S300 can move the second section S420 in the first direction D1.

In this embodiment, a plurality of storage regions R are disposed in the main body S100 of the packstation S, and the packstation S further includes charger S500 disposed in positions that correspond to the storage regions R. The lifter S300 and the conveyor S400 can transport the inner housing 100 to one of the storage regions R, and the charger S500 can provide power to the power supply 300 by a wireless manner or a wired manner when the inner housing 100 is stored in the storage region R.

Figure 6F:
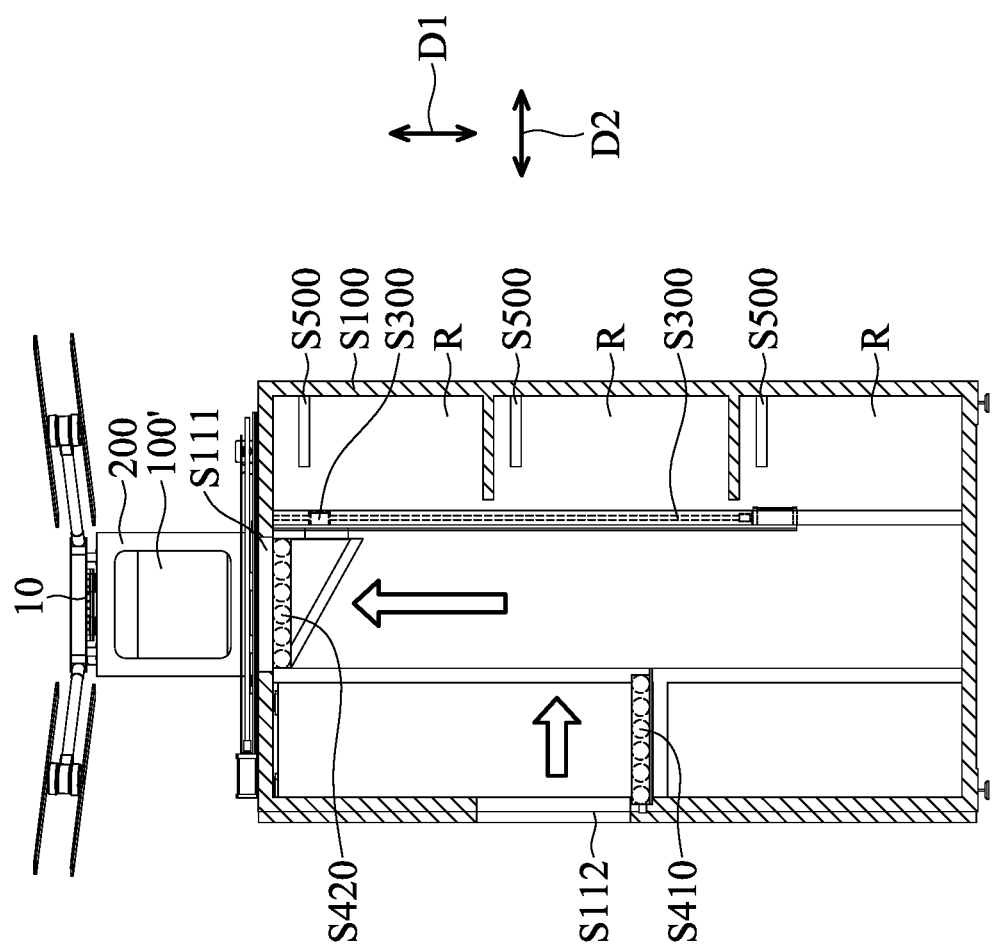
FIG. 6F is a schematic diagram representing that a lifter and a conveyor move another inner housing from the pick-up opening to the delivery opening according to an embodiment of the disclosure.

As shown in FIG. 6F, after the inner housing 100 is picked up via the pick-up opening S112 or stored in the storage region R, another housing 100' can be transported from the pick-up opening S112 or the storage region R to the delivery opening S111 by the lifter S300 and the conveyor S400, and transported to a receiving space 201 via the delivery opening S111. After the inner housing 100' is affixed by the solenoid valve 500, the UAV 10 can leave the packstation S and move to another packstation. The structure of the inner housing 100' is the same as that of the inner housing 100, so that it also can provide power to the battery 12 in the UAV 10.

Since the power supply 300 and the charging module 400 are disposed in the container device C, the UAV 10 does not need to stop to charge the battery 12 therein, and the transport efficiency can be greatly enhanced. Furthermore, since the power supply 300 can provide power when the UAV 10 moves, the operating time and the moving distance of the UAV 10 can be efficiently increased.

In summary, a container device of a UAV is provided. The container device is configured to receive a cargo and be connected to a UAV. The container device includes an outer housing, an inner housing, and a power supply. The outer housing is connected to the UAV. The inner housing is detachably connected to the outer housing, and configured to receive the cargo. The power supply is disposed in the inner housing. When the outer housing is connected to the UAV and the inner housing is connected to the outer housing, the power supply is electrically connected to a battery of the UAV.

A transport system of a UAV is also provided, including the aforementioned container device and a packstation. The packstation includes a main body, a lifter, and a conveyor. The main body has a delivery opening and a pick-up opening. The lifter is disposed in the main body, and is connected to the delivery opening. The conveyor is disposed in the main body, and is connected to the lifter and the pick-up opening. The lifter is configured to move the inner housing in a first direction, and the conveyor is configured to move the inner housing in a second direction. The first direction is different from the second direction.

The effect of the disclosure is in that the flight time of the UAV can be increased, the transport distance can be increase, and the number of recharges or change the battery can be reduced. Therefore, the transport efficiency can be enhanced.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the disclosure has been described by way of example and in terms of preferred embodiment, it should be understood that the disclosure is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A container device of a UAV, configured to receive a cargo and be connected to the UAV, wherein the container device comprises:
   an outer housing, connected to the UAV, and having a top wall and an opening, wherein the top wall and the opening are disposed on opposite sides of the outer housing;
   an inner housing, detachably connected to the outer housing and having an accommodating space configured to receive the cargo, wherein the inner housing has a top surface facing the top wall and a bottom surface facing away the top wall, and the accommodating space is disposed between the top surface and the bottom surface; and
   a power supply, attached to the top surface of the inner housing, and disposed between the top wall and the opening.

2. The container device of the UAV as claimed in claim 1, wherein when the outer housing is connected to the UAV and the inner housing is connected to the outer housing, the power supply is electrically connected to a battery in the UAV in a wireless manner.

3. The container device of the UAV as claimed in claim 1, wherein the container device further comprises:
   a first charging module, disposed on the inner housing and electrically connected to the power supply; and
   a second charging module, corresponding to the first charging module and disposed on the outer housing, wherein when the outer housing is connected to the UAV, the second charging module is electrically connected to a battery in the UAV.

4. The container device of the UAV as claimed in claim 3, wherein the first charging module and the second charging module are wireless charging modules corresponding to each other.

5. The container device of the UAV as claimed in claim 3, wherein the first charging module and the second charging module are electric contacts corresponding to each other, and when the inner housing is connected to the outer housing, the first charging module is in contact with the second charging module.

6. The container device of the UAV as claimed in claim 1, wherein the container device further comprises a solenoid valve disposed on the outer housing.

7. The container device of the UAV as claimed in claim 6, wherein the solenoid valve comprises:
   a locking member;
   a coil, connected to the locking member;
   a magnetic member, disposed on the outer housing; and
   an elastic member, connected to the locking member and the outer housing, wherein when the inner housing is connected to the outer housing and the locking member is in a first position, the locking member is in contact with the inner housing, wherein when a current flows through the coil, the locking member moves from the first position to a second position and separates from the inner housing.

8. The container device of the UAV as claimed in claim 1, wherein when the inner housing is connected to the outer housing, the outer housing surrounds the inner housing.

9. The container device of the UAV as claimed in claim 1, wherein the container device further comprises an intermediate component disposed on the outer housing, the intermediate component comprises an engaging slot, and the intermediate component is connected to the UAV via the engaging slot.

10. The container device of the UAV as claimed in claim 9, wherein the engaging slot has a T-shaped structure or an L-shaped structure.

11. A transport system of a UAV, comprising:
    a container device, comprising:
       an outer housing, connected to the UAV;
       an inner housing, detachably connected to the outer housing and configured to receive the cargo; and
       a power supply, disposed on the inner housing; and
    a packstation, comprising:
       a main body, having a delivery opening and a pick-up opening;
       a lifter, disposed in the main body and connected to the delivery opening; and
       a conveyor, disposed in the main body and connected to the lifter and the pick-up opening, wherein the lifter is configured to move the inner housing in a first direction, the conveyor is configured to move the inner housing in a second direction, and the first direction is perpendicular to the second direction, wherein the delivery opening and the conveyor are arranged along the first direction, the pick-up opening and the conveyor are arranged along the second direction, the conveyor has a first section and a second section, and the second section is movable along the first direction relative to the first section, wherein when the second section is in a position corresponding to the pick-up opening, the first section and the second section are coplanar, wherein the packstation further comprises a storage region and a charger, the lifter and the conveyor are able to transport the inner housing to the storage regions, and the charger is able to provide power to the power supply by a wireless manner or a wired manner when the inner housing is stored in the storage region.

12. The transport system of the UAV as claimed in claim 11, wherein the position of the first section is affixed relative to the main body, and the lifter can move the second section in the first direction.

13. The transport system of the UAV as claimed in claim 11, wherein the packstation further comprises a positioner disposed on the main body, and when the container device is disposed on the packstation, the positioner moves the container device to align the container device to the delivery opening.

14. The transport system of the UAV as claimed in claim 13, wherein the positioner comprises:
   a first longitudinal member, wherein the first longitudinal member is movable in a first moving direction; and
   a second longitudinal member, wherein the second longitudinal member is movable in a second moving direction, wherein a longitudinal axis of the first longitudinal member is parallel to the second moving direction, and a longitudinal axis of the second longitudinal member is parallel to the first moving direction.

15. The transport system of the UAV as claimed in claim 11, wherein the lifter and the conveyor are movable to align the conveyor to the storage region.

* * * * *